(12) United States Patent
Sulsky

(10) Patent No.: US 12,534,777 B2
(45) Date of Patent: Jan. 27, 2026

(54) CARBOALUMINOTHERMIC REDUCTION APPARATUS AND METHODS OF USING

(71) Applicant: Martin Samuel Sulsky, Kearneysville, WV (US)

(72) Inventor: Martin Samuel Sulsky, Kearneysville, WV (US)

(*) Notice: Subject to any disclaimer, the term of this patent is extended or adjusted under 35 U.S.C. 154(b) by 635 days.

(21) Appl. No.: 18/055,771

(22) Filed: Nov. 15, 2022

(65) Prior Publication Data

US 2023/0151455 A1  May 18, 2023

Related U.S. Application Data

(60) Provisional application No. 63/280,664, filed on Nov. 18, 2021.

(51) Int. Cl.
C22B 34/12 (2006.01)
C22B 5/04 (2006.01)
C22B 5/10 (2006.01)

(52) U.S. Cl.
CPC ............ C22B 34/1277 (2013.01); C22B 5/04 (2013.01); C22B 5/10 (2013.01)

(58) Field of Classification Search
CPC ......... C22B 34/1277; C22B 5/04; C22B 5/10; C22B 5/12
USPC .................................................. 75/614, 615
See application file for complete search history.

(56) References Cited

U.S. PATENT DOCUMENTS

| | | | |
|---|---|---|---|
| 3,607,221 | A | 9/1971 | Kibby |
| 4,005,856 | A | 2/1977 | Themelis et al. |
| 4,146,389 | A | 3/1979 | Karlovitz |
| 4,169,722 | A | 10/1979 | Fletcher |
| 4,441,920 | A | 4/1984 | Wilkening |
| 4,470,845 | A | 9/1984 | Yannopoulos |

(Continued)

FOREIGN PATENT DOCUMENTS

| | | |
|---|---|---|
| CN | 100469910 | 3/2009 |
| CN | 111809061 | 10/2020 |

(Continued)

OTHER PUBLICATIONS

Sayad-Yaghoubi, Yaghoub, "Carbothermic Processes to Replace the Hall-Heroult Process", ResearchGate, Nov. 2014, https://www.researchgate.net/publication/269040121, 13 pages.

(Continued)

Primary Examiner — Adil A. Siddiqui
(74) Attorney, Agent, or Firm — Knobbe, Martens, Olson & Bear, LLP

(57) ABSTRACT

Apparatuses and methods of making titanium or a titanium alloy which include providing a first feed material and a carbon source material to a first reaction chamber in which the first feed material includes a solid aluminum oxide. The method also includes heating the first feed material and the carbon source material to reduce the solid aluminum oxide to one or more gaseous species including aluminum. The method also includes providing the one or more gaseous species including aluminum to a second reaction chamber, the second reaction chamber containing a second feed material which includes a solid titanium oxide. The method also includes reducing the solid titanium oxide with the one or more gaseous species including aluminum to form molten titanium metal or molten titanium alloy.

13 Claims, 2 Drawing Sheets

(56) References Cited

U.S. PATENT DOCUMENTS

| | | | |
|---|---|---|---|
| 4,769,067 | A | 9/1988 | Cochran et al. |
| 6,699,305 | B2 | 3/2004 | Myrick |
| 7,001,443 | B2 | 2/2006 | Woodfield et al. |
| 8,864,873 | B2 | 10/2014 | Chen et al. |
| 2018/0037974 | A1 | 2/2018 | Abayaweera et al. |
| 2018/0202024 | A1 | 7/2018 | Feng et al. |
| 2019/0241994 | A1* | 8/2019 | Dou .................... C22B 34/1277 |

FOREIGN PATENT DOCUMENTS

| | | | |
|---|---|---|---|
| JP | S5215409 | A | 2/1977 |
| JP | S5914093 | B2 | 4/1984 |
| JP | 2014019919 | A | 2/2014 |
| JP | 2019525002 | A | 9/2019 |

OTHER PUBLICATIONS

Liu, et al., "Prediction of new thermodynamically stable aluminum oxides", Scientific Reports, 5:9518, DOI: 10.1035, srep09518, Apr. 1, 2015, 6 pages.

Halmann, et al., "Vacuum Carbothermic Reduction of Bauxite Components: A Thermodynamic Study", Minteral Processing & Extractive Metall. Rev., 33: 190-203, 2012, 14 pages.

Epstein, et al., "Vacuum Carbothermic Reduction of Alumina", ResearcGate, Mineral Processing and Extractive Metallurgy Review, Mar. 2014, 9 pages.

Non-Final Office Action received for Japanese Patent Application No. 2024-529807, mailed on May 27, 2025, 4 pages.

* cited by examiner

CARBOALUMINOTHERMIC REDUCTION APPARATUS AND METHODS OF USING

PRIORITY CLAIM AND INCORPORATION BY REFERENCE TO ANY PRIORITY APPLICATIONS

This application claims the benefit of U.S. Provisional Application No. 63/280,664, filed Nov. 18, 2021, entitled "CARBOALUMINOTHERMIC REDUCTION APPARATUS AND METHODS OF USING", the entireties of which is hereby incorporated by reference.

BACKGROUND

Aluminothermic reduction methods for the production of titanium have been investigated. These methods typically entail making a mixture of a solid metallic aluminum powder and a powder having a titanium oxide material and then heating the mixture to react the solid metallic aluminum powder with the titanium oxide to reduce the titanium oxide to titanium metal. These methods have proven to be very energy intensive as they first require the production of metallic aluminum powder as a reducing agent. Furthermore, these methods are typically configured for batch processing and thus, not run continuously.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
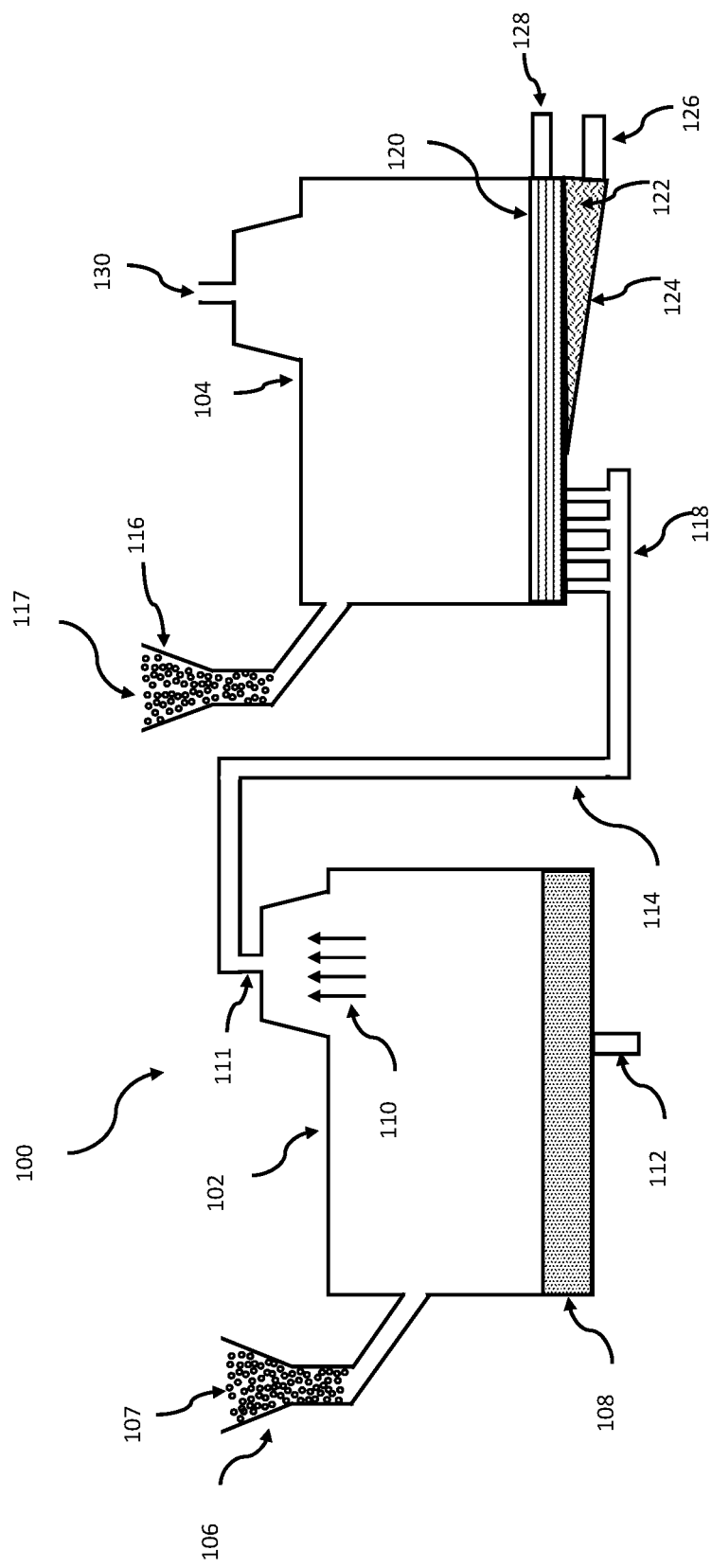
FIG. 1 is a schematic diagram illustrating an apparatus for the aluminothermic reduction of titanium in accordance with various embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, the apparatuses and methods of the present disclosure can be used to produce titanium metal. In some embodiments, the apparatuses and methods of the present disclosure can be used to produce titanium alloys. Example alloying elements may include, but are not limited to, aluminum, vanadium, molybdenum tin, zirconium and silicon.

In various embodiments, the apparatuses and methods of the present disclosure may be used for the carboaluminothermic reduction of titanium and/or the fabrication titanium alloys. Embodiment apparatuses of the present disclosure comprises two reaction chambers. In the first reaction chamber aluminum oxides in a first feed material may be reduced with a carbon reducing agent to form various gaseous aluminum species. The various gaseous aluminum species may then be provided to the second reaction chamber. A second material comprising a solid titanium oxide may also be provided to the second reaction chamber. In the second reaction chamber, the various gaseous aluminum species may be used to reduce the solid titanium oxide and thereby form liquid titanium metal. In various embodiments, compounds comprising desirable alloying elements may also be added to the second feed such that a titanium alloy is produced. In other embodiments, one or more subsequent alloying step may be performed to make a desired titanium alloy.

Benefits of the various method and apparatus embodiments discussed below include the ability to make titanium and titanium alloys without an initial step of first making a metallic aluminum powder reducing agent. An additional benefit is a reduction in the total energy input/increase in energy efficiency of the titanium reduction process. This benefit is a direct consequence of providing the second reaction chamber with the heated aluminum gaseous reducing agents which results in the elimination of the step of making a powder aluminum reducing agent. A further benefit of the embodiment methods and apparatuses of the instant application is the ability to make the production of titanium metal and titanium alloys in a continuous process rather than the conventional batch processes.

Referring to FIG. 1, an embodiment of the apparatus 100 includes a first reaction chamber 102 and a second reaction chamber 104. The first reaction chamber 102 may include a first feed port 106. The first feed port 106 may include any suitable feed mechanism, such as, but not limited to, a gravity feed, vibrational feed or an auger. A first feed material 107 may be provided to the first reaction chamber 102 via the first feed port 106.

In various embodiments, the first feed material 107 comprises a solid aluminum oxide, such as $Al_2O_3(s)$. In addition, at least one carbon based reducing agent may be added to the first reaction chamber 102. Upon heating the first feed material 107, one or more gaseous aluminum species 110 may be formed.

In some embodiments, the carbon based reducing agent may be a solid such as coal, e.g. anthracite, bituminous, subbituminous, lignite or charcoal. The solid carbon based reducing agent may be added to the solid aluminum oxide or added separately to the first reaction chamber 102. In alternative embodiments the carbon based reducing agent may be gaseous, such as natural gas, methane, propane or any other suitable carbon based gas or mixture of gases.

As discussed in more detail below, the first feed material 107 comprising the solid aluminum oxide and the carbon based reducing agent may be heated in the first reaction chamber 102 to a temperature sufficiently high enough to reduce the aluminum oxide to one or more gaseous aluminum species 110. The one or more gaseous aluminum species 110 may include, for example, Al(g) and/or AlO(g). As illustrated in FIG. 1, an upper portion of the first reaction chamber may include a first gas exit port 111. Further illustrated in FIG. 1 and discussed in more detail below, a first slag 108 may be formed in a bottom portion of the first chamber 102. A first tap port 112 may be included in the bottom portion of the first reaction chamber 102 to remove excess first slag 108.

A conduit 114 connects the first reaction chamber 102 to a second reaction chamber 104. The one or more gaseous aluminum species 110 may be passed from the first reaction chamber 102 to the second reaction chamber 104 via the conduit 114. In various embodiments, the conduit 114 may be connected to a manifold 118 located at a bottom portion of the second reaction chamber 104 to more evenly distribute the one or more gaseous aluminum species 110 in the second reaction chamber.

The second reaction chamber includes a second feed port 116 through which a second feed material 117 may be provided. Similar to the first feed port 106, the second feed port 116 may include any suitable feed mechanism, such as, but not limited to, a gravity feed, vibrational feed or an auger. The second reaction chamber 104 may include a sump 124 located in a bottom portion of the second reaction chamber. In operation, as illustrated in FIG. 1 and discussed in more detail below, a second slag 120 may be formed in a bottom portion of the second reaction chamber. Further illustrated in FIG. 1, a layer of molten titanium or molten titanium alloys 122 may form and sink to the sump. The molten titanium or molten titanium alloys 122 sink below the second slag 120 because they have a greater density than the second slag 120.

The second reaction chamber 104 of the apparatus 100 may also include a second tap port 126 configured to remove molten titanium or molten titanium alloys 122 from the sump 122 in the second reaction chamber 104. Additionally, the second reaction chamber 104 may include a third tap port 128 configured to remove excess second slag 120 from the second reaction chamber 104. As illustrated, in FIG. 1, the second slag 120 typically has a lower density than the molten titanium or molten titanium alloys 122 and floats on top of the molten titanium or molten titanium alloys 122. Further, the second reaction chamber 104 may include a second gas exit port 130, typically located in an upper portion of the second reaction chamber 104. The second gas exit port 130 may be configured to remove reaction gases from the second reaction chamber 104.

Figure 2:
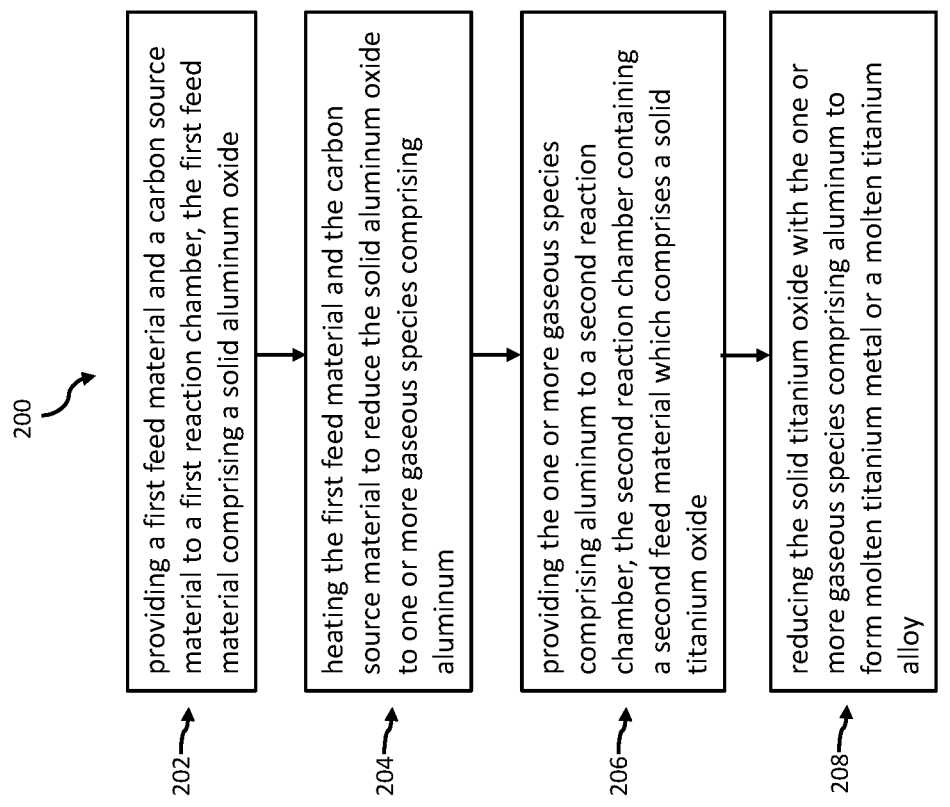
FIG. 2 is a flowchart illustrating a method of making titanium metal in accordance with various embodiments of the disclosure.

FIG. 2 is a flow diagram illustrating a method 200 of carboaluminothermically making titanium metal of a titanium alloy according to an embodiment. Referring to FIG. 2, the method includes a step 202 of providing a first feed material 107 and a carbon source material to a first reaction chamber 102. The first feed material 107 includes a solid aluminum oxide, such as $Al_2O_3$. In some embodiments, first feed material 107 comprises various non-aluminum oxides and hydroxides, such as oxides and hydroxides of iron and silicon.

Referring to step 204, the method includes, heating the first feed material 107 and the carbon source material to reduce the solid aluminum oxide to one or more gaseous species 110 comprising aluminum. As discussed above, the one or more gaseous aluminum species 110 may include, for example, Al(g) and/or AlO(g).

In reducing the solid aluminum oxide, one or more of the following reactions may occur:

$$Al_2O_3+2C=Al_2O(g)+2CO(g) \qquad 1.$$

$$Al_2O_3+3C=2Al(g)+3CO(g) \qquad 2.$$

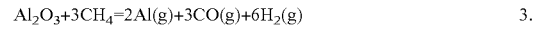

$$Al_2O_3+3CH_4=2Al(g)+3CO(g)+6H_2(g) \qquad 3.$$

$$Al_2O_3+4Al=3Al_2O(g) \qquad 4.$$

The above reactions may occur in a temperature range of 1000° C. to 1800° C., such as in a range of 1100° C. to 1700° C., such as in a range of 1200° C. to 1600° C.

In some embodiments, the first feed material may include various aluminum hydroxides in addition to aluminum oxides. In reducing a solid aluminum hydroxide, one or more of the following reactions may occur:

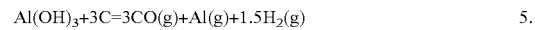

$$Al(OH)_3+3C=3CO(g)+Al(g)+1.5H_2(g) \qquad 5.$$

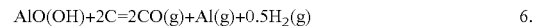

$$AlO(OH)+2C=2CO(g)+Al(g)+0.5H_2(g) \qquad 6.$$

Further, naturally occurring aluminum ores, such as bauxite may also include iron oxides, iron hydroxide and aluminum silicates. When heating the first feed material 107, a first slag 108 may form. The first slag tends to flow to a bottom portion of the first chamber 102. As discussed above, a first tap port 112 may be provided in the bottom portion of the first chamber 102 to periodically remove excess slag 108.

The following equation illustrates one reaction leading to a formation of the first slag 108:

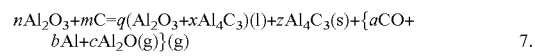

$$nAl_2O_3+mC=q(Al_2O_3+xAl_4C_3)(l)+zAl_4C_3(s)+\{aCO+bAl+cAl_2O(g)\}(g) \qquad 7.$$

Upon continued heating, one or more of the following reactions may occur in the slag:

$$Al_2O_3+Al_4C_3=3Al_2O(g)+3C(g) \qquad 8.$$

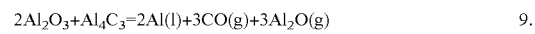

$$2Al_2O_3+Al_4C_3=2Al(l)+3CO(g)+3Al_2O(g) \qquad 9.$$

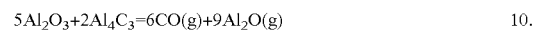

$$5Al_2O_3+2Al_4C_3=6CO(g)+9Al_2O(g) \qquad 10.$$

In some embodiments, one or more flux materials may be added to the first feed material to aid in slag formation. The one or more flux materials may include, but are not limited to, salts of chorine and fluorine.

Referring to step 206, the method includes providing the one or more gaseous species 110 comprising aluminum to a second reaction chamber 204, the second reaction chamber 204 containing a second feed material 117 which comprises a solid titanium oxide. In various embodiments, a second feed material 117 comprising a solid titanium oxide, such as, $Ti_3O$, $Ti_3O_2$, $TiO$, $TiO_2$, $Ti_2O_3$, $Ti_3O_5$, $Ti_2O_2$, may be provided to the second reaction chamber 104 via a second feed port 116. The solid titanium oxide may be found in minerals such as, but not limited to rutile, ilmenite and leucoxene.

Referring to step 208, the method includes reducing the solid titanium oxide with the one or more gaseous species comprising aluminum to form molten titanium metal or a molten titanium alloy. In this step, the second feed material 117 and the gaseous aluminum species 110 may be heated to a temperature sufficiently high, such as a temperature range of 900° C. to 1300° C., such as 1000-1200, to cause the reduction of the solid titanium oxide by the gaseous aluminum species 110. In various embodiments, the second feed material 117 may include compounds of alloying elements used for the fabrication of various titanium alloys. As discussed above, alloying elements may include, but are not limited to, aluminum, vanadium, molybdenum tin, zirconium and silicon. Further, as discussed in more detail below, various flux materials may be added to the first and/or second reaction chambers 102, 104 to facilitate the slag formation. As discussed above, The flux materials may include, but are not limited to, salts of chorine and fluorine.

In reducing the solid titanium oxide, one or more of the following reactions may occur:

$$3Na_2TiF_6 + 2NaF + (3x+4)Al = 3TiAl_x + Na_3AlF_6 + NaAlF_{14} \quad (11)$$

Where $10 \geq x \geq 0$ $$12Na_2TiF_6 + (12x+16)Al = 12TiAl_x + 3Na_3AlF_6 + 3Na_5Al_3F_{14} + 4AlF_3 \quad (12)$$

Where $10 \geq x \geq 0$ $$3K_2TiF_6 + 4Al = 3Ti + 6KF + 4AlF_3 \quad (13)$$

$$K_2TiF_6 + 2Mg = Ti + 2MgF_2 + 2KF \quad (14)$$

$$AlO(OH) + 0.1TiO_2 + 2.2C = 2.1CO(g) + 0.82Al(g) + 0.5H_2(g) + 0.1TiC(s) + 0.086Al_2O(g) + 0.005Al_2O_3(g) \quad (15)$$

In some embodiments, the second slag further comprises at least one of CaF, CaO, $V_2O_3$ or $V_2O_5$. In some embodiments, the titanium alloy comprises at least one of Al, V, Mo, Sn, Zr or Si. In other embodiments, the method may include adding one or more alloying elements in a subsequent alloying step. That is, in a separate alloying step performed after the production of the titanium or a titanium alloy in the apparatus discussed above. The one or more alloying elements may include at least one of Al, V, Mo, Sn, Zr or Si.

Various embodiments of the present disclosure may provide apparatuses and methods of carboaluminothermically producing titanium and/or titanium alloys.

An embodiment includes a method of making titanium or a titanium alloy including providing a first feed material and a carbon source material to a first reaction chamber in which the first feed material includes a solid aluminum oxide. The method also includes heating the first feed material and the carbon source material to reduce the solid aluminum oxide to one or more gaseous species including aluminum. The method also includes providing the one or more gaseous species including aluminum to a second reaction chamber, the second reaction chamber containing a second feed material which includes a solid titanium oxide. The method also includes reducing the solid titanium oxide with the one or more gaseous species including aluminum to form molten titanium metal or molten titanium alloy.

Another embodiment includes an apparatus for the making of titanium or a titanium alloy including a first reaction chamber and a second reaction chamber fluidly connected to the first reaction chamber. The first reaction chamber is maintained at a first temperature to form one or more gaseous species including aluminum, the one or more gaseous species including aluminum may be provided to the second reaction chamber from the first reaction chamber via at least one conduit and the second reaction chamber may be maintained at a second temperature to react the one or more gaseous species including aluminum with a titanium oxide to form molten titanium metal or a molten titanium alloy.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of making titanium or a titanium alloy comprising:
   providing a first feed material and a carbon source material to a first reaction chamber, the first feed material comprising a solid aluminum oxide;
   heating the first feed material and the carbon source material to reduce the solid aluminum oxide to one or more gaseous species comprising aluminum;
   providing the one or more gaseous species comprising aluminum to a second reaction chamber, the second reaction chamber containing a second feed material which comprises a solid titanium oxide;
   reducing the solid titanium oxide with the one or more gaseous species comprising aluminum to form molten titanium metal or a molten titanium alloy.

2. The method of claim 1, further comprising removing gaseous reaction products from the second reaction chamber through a gas exit port.

3. The method of claim 1, further comprising removing a first slag from the first reaction chamber through a first tap port.

4. The method of claim 3, where the first slag comprises liquid $Al_2O_3$.

5. The method of claim 4, wherein the first slag further comprises at least one of a silicon oxide or an iron oxide.

6. The method of claim 1, further comprising removing liquid titanium metal from the second reaction chamber through a second tap port.

7. The method of claim 6, further comprising forming a second slag in the second reaction chamber, the second slag located above the liquid titanium metal.

8. The method of claim 7, further comprising removing the second slag from the second reaction chamber through a third tap port.

9. The method of claim 7, wherein the second slag comprises $TiO_2$.

10. The method of claim 9, wherein the second slag further comprises at least one of CaF, CaO, $V_2O_3$ or $V_2O_5$.

11. The method of claim 1, wherein the titanium alloy comprises at least one of Al, V, Mo, Sn, Zr or Si.

12. The method of claim 1, further comprising adding one or more alloying elements in a subsequent alloying step.

13. The method of claim 12, wherein the one or more alloying elements comprises at least one of Al, V, Mo, Sn, Zr or Si.

* * * * *